United States Patent
Kuwazuru et al.

(10) Patent No.: US 8,985,992 B2
(45) Date of Patent: Mar. 24, 2015

(54) EXTRUSION DIE HEAD

(75) Inventors: Mitsuo Kuwazuru, Yokohama (JP); Jou Honda, Yokohama (JP); Takuji Hashimoto, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 53 days.

(21) Appl. No.: 13/808,797

(22) PCT Filed: Jul. 7, 2011

(86) PCT No.: PCT/JP2011/003915
§ 371 (c)(1),
(2), (4) Date: Feb. 21, 2013

(87) PCT Pub. No.: WO2012/014389
PCT Pub. Date: Feb. 2, 2012

(65) Prior Publication Data
US 2013/0149406 A1 Jun. 13, 2013

(30) Foreign Application Priority Data
Jul. 26, 2010 (JP) ................................. 2010-167215

(51) Int. Cl.
*B29C 47/08* (2006.01)
*B29C 47/22* (2006.01)
*B29C 47/00* (2006.01)

(52) U.S. Cl.
CPC ......... *B29C 47/0852* (2013.01); *B29C 47/0877* (2013.01); *B29C 47/0828* (2013.01); *B29C 47/0883* (2013.01); *B29C 47/22* (2013.01); *B29C 47/225* (2013.01); *B29C 47/0021* (2013.01)

USPC ............................ 425/380; 425/190; 425/466

(58) Field of Classification Search
CPC ............ B29C 47/0828; B29C 47/0852; B29C 47/0883; B29C 47/22; B29C 47/225; B29C 47/0877
USPC ........................... 425/380, 381, 190, 466, 467
See application file for complete search history.

(56) References Cited

U.S. PATENT DOCUMENTS 4,124,351 A * 11/1978 Garbuio ........................ 425/532

FOREIGN PATENT DOCUMENTS

| CN | 2875773 Y | 3/2007 |
|---|---|---|
| CN | 201064942 Y | 5/2008 |
| CN | 201220477 Y | 4/2009 |
| JP | 1978-55687 U | 10/1976 |

(Continued)

OTHER PUBLICATIONS

PCT, "International Search Report for PCT/JP2011/003915", Oct. 11, 2011.

(Continued)

*Primary Examiner* — Joseph S Del Sole
*Assistant Examiner* — Lawrence D Hohenbrink, Jr.
(74) *Attorney, Agent, or Firm* — Manabu Kanesaka

(57) ABSTRACT

When extrusion molding is conducted continuously for a long period of time, in order to prevent a die drool from being generated at an outlet of an extruder, to a shell 2 in which an outlet 3, through which a melt-kneaded resin material is extruded by an extruder, is formed, a plate-like shell tip 6 in which an opening 7 which is arranged such that it surrounds the outlet 3 along the circumference thereof is detachably attached, and non-sticky coating is applied at least along the outer surface of the core tip.

14 Claims, 5 Drawing Sheets

(56) References Cited

FOREIGN PATENT DOCUMENTS

| JP | H06-190904 A | 7/1994 |
| JP | H06-198705 A | 7/1994 |
| JP | H09-234780 A | 9/1997 |
| JP | 2000-52403 A | 2/2000 |
| JP | 2005-111803 A | 4/2005 |

OTHER PUBLICATIONS

China Patent Office, "Office Action for CN201180036033.6," Jul. 8, 2014.

* cited by examiner

EXTRUSION DIE HEAD

RELATED APPLICATIONS

The present application is National Phase of International Application No. PCT/JP2011/003915 filed Jul. 7, 2011, and claims priority from Japanese Application No. 2010-167215, filed Jul. 26, 2010.

TECHNICAL FIELD

The present invention relates to an extrusion die head for extruding a molten resin material which is provided at the front end part of an extruder and is used to extrude a molten resin such that it has a predetermined cross-sectional shape.

BACKGROUND ART

In extrusion molding, in general, by extruding a resin material which has been melt-kneaded by means of an extruder through a resin channel formed in a channel in an extrusion die head provided at the front end part of the extruder, a molded article having a predetermined cross-sectional shape is continuously shaped. It is known that, at this time, when molding is continued for a long period of time, a deteriorated resin is adhered to the outlet of the extrusion die head (see FIG. 5 which shows the outline of one example of a conventional extrusion die head). Such an adhered matter is generally referred to as a die drool. If molding is continued with a die drool being adhered to the outlet of the extrusion die head, problems occur that the die drool is mixed in a molded article, whereby the quality of the molded article is deteriorated and traces of the die drool (die lines) are formed on the surface of the molded article in the form of a line to deteriorate the external appearance of the molded article.

In order to prevent a die drool from being formed, it is required to conduct troublesome works, i.e. to stop the molding at a predetermined interval and dismantle and clean the extrusion die head. Further, whenever the molding is stopped, the production line must be suspended, and as a result, removal of a die drool results in lowering in productivity.

Conventionally, in order to prevent generation of such a die drool, various technologies have been proposed. For example, in Patent Document 1, a nozzle piece is installed to a die plate in an exchangeable manner, and a die drool is removed together with the nozzle piece, whereby the time or cost incurred for the removal of a die drool is attempted to be reduced. In Patent Document 2, a cylindrical member having a tapered part in the inside thereof is installed to a die lip part, whereby the die drool generated in the die lip part is adhered to the tapered part and is then transferred from the die lip part to the tapered part by extrusion force, whereby the die drool is removed.

RELATED ART DOCUMENTS

Patent Documents

Patent Document 1: JP-A-2000-52403
Patent Document 2: JP-A-2005-111803

SUMMARY OF THE PRESENT INVENTION

Subject to be Solved by the Invention

However, in a technology disclosed in Patent Document 1, although the time or cost required for the removal of a die drool can be decreased, the production line has to be stopped when the nozzle piece is exchanged. Therefore, the productivity cannot be increased by the technology disclosed in Patent Document 1. In addition, in a technology disclosed in Patent Document 2, when a cylindrical parison or the like is molded by extrusion which is used in blow molding, for example, it is impossible to remove a die drool generated inside such a parison. That is, in any of conventional technologies, satisfactory results cannot be obtained.

Generation mechanism of a die drool is so complicated, and the full picture thereof has not been elucidated yet. The inventors made extensive studies taking into consideration the fact that the resin adhered to the outlet of the extrusion die head is gradually deposited while being deteriorated with the passage of time. The inventors have found that, by allowing a resin to be hardly adhered to the outlet of an extrusion die head, generation of a die drool can be suppressed. The present invention has been made based on this finding.

That is, an object of the present invention is to provide an extrusion die head which can suppress generation of a die drool in the outlet of the die head when extrusion molding is conducted continuously for a long period of time.

Means for Solving the Subject

The invention includes an extrusion die head attached to front end part of an extruder, comprising: a shell having an outlet for extruding a resin material which has been melt-kneaded by the extruder; a plate-like shell tip having an opening to be arranged along circumference of the outlet in such a manner that the opening surrounds the outlet; the shell tip detachably attached to the shell; and non-sticky coating applied at least along inner circumference of the opening formed in the shell tip.

Advantageous Effects of the Invention

According to the extrusion die head of the present invention, it is possible to prevent generation of a die drool at the outlet thereof completely or for a long period of time.

MODE FOR CARRYING OUT THE INVENTION

Hereinbelow, preferred embodiments of the extrusion die head of the present invention will be explained with reference to the drawings.

[First Embodiment]

At first, the first embodiment of the extrusion die head of the present invention will be explained.

Figure 1:
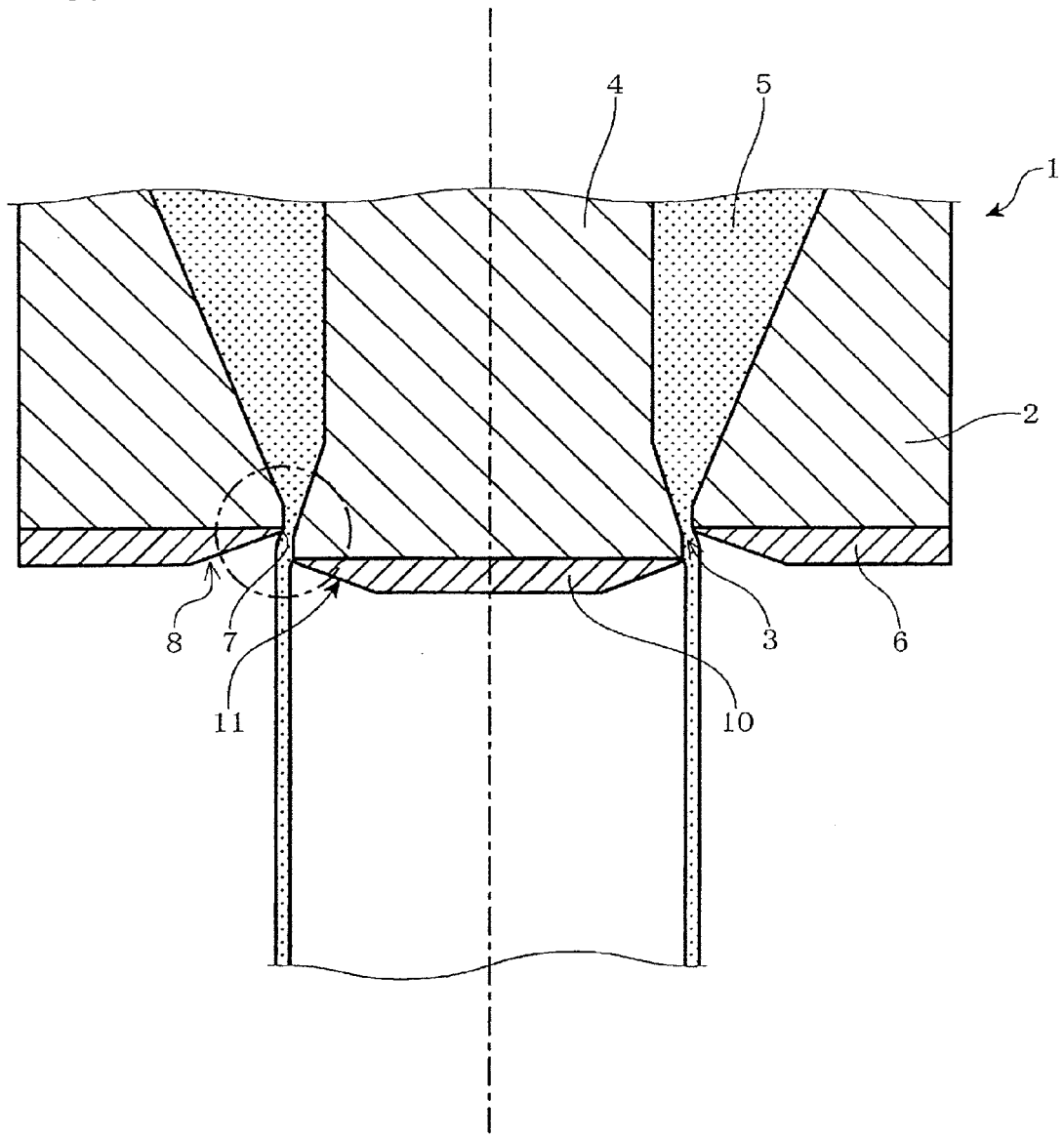
FIG. 1 is a cross-sectional view of essential parts showing the outline of the first embodiment of the extrusion die head according to the present invention.
Figure 2:
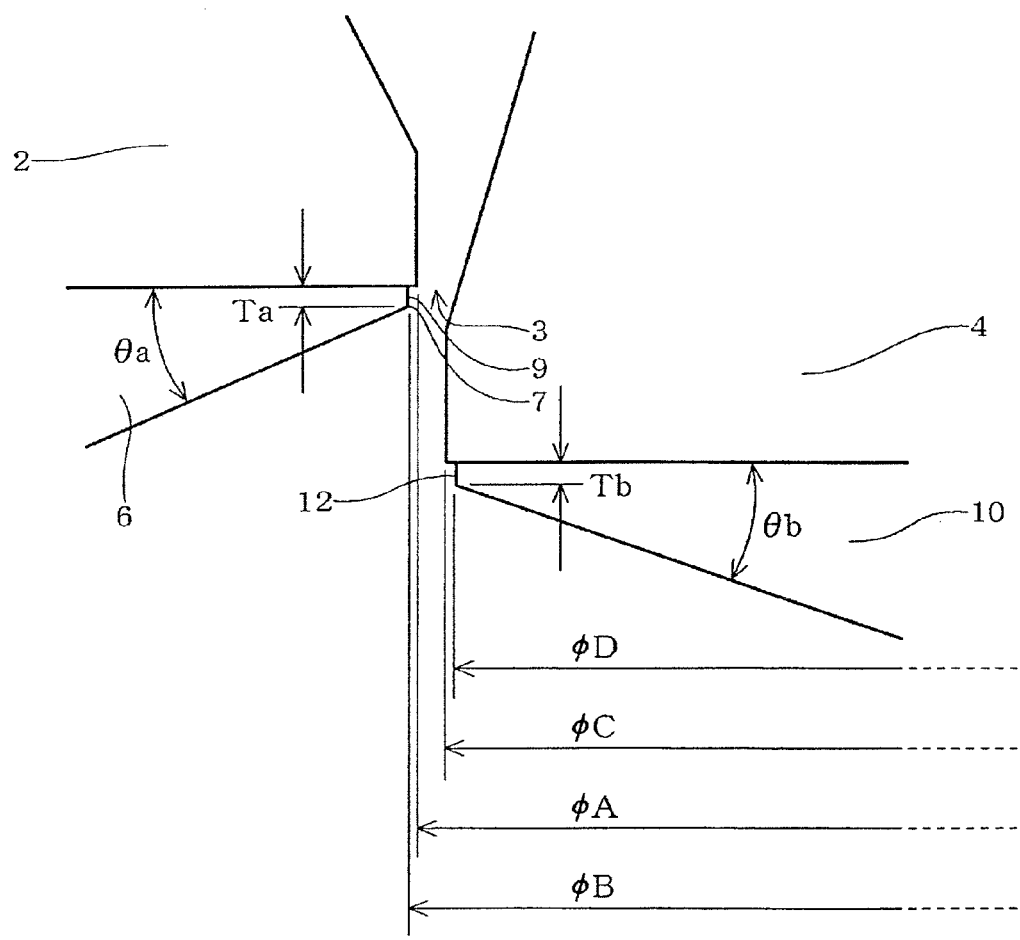
FIG. 2 is an enlarged cross-sectional view of essential parts of the first embodiment of the extrusion die head according to the present invention.
Figure 3:
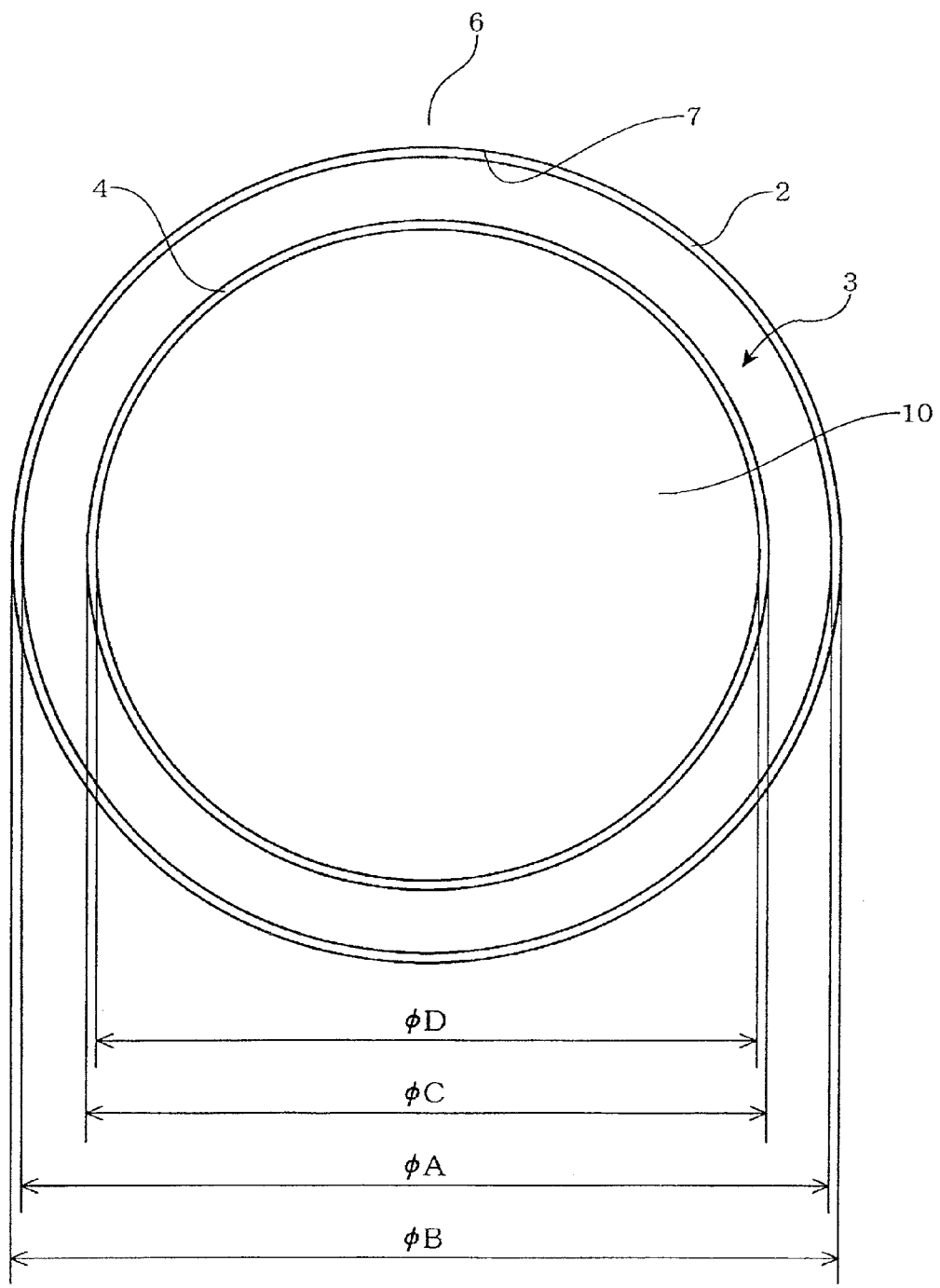
FIG. 3 is a schematic plan view of the vicinity of the outlet of the extrusion die head according to the present invention shown in FIG. 1, as viewed from below.

FIG. 1 is a cross-sectional view showing the outline of the essential parts of the extrusion die head of this embodiment, mainly the outlet thereof. FIG. 2 is an enlarged cross-sectional view of essential parts showing the part encircled by a dashed line in FIG. 1. FIG. 3 is a schematic plan view showing the vicinity of the outlet of the extrusion die head shown in FIG. 1, as viewed from below.

In these drawings, the dimension of each part is depicted in an exaggerated manner, according to need (the same can be applied to FIGS. 4 and 5, mentioned later), The extrusion die head 1 of this embodiment has a shell 2 forming an outlet 3 and a core 4 which is provided in the shell 2 with a predetermined gap being formed between the outlet 3 formed in the shell 2. Due to such a configuration, the extrusion die head 1 is installed to the front end part of an extruder (not shown), and a resin material which has been melt-kneaded by means of the extruder is extruded in a hollow shape from the outlet 3 which opens in a ring-like shape via a resin channel 5 formed between the shell 2 and the core 4.

In the example shown in FIG. 1, on the opening side of the outlet 3 (in the figure, the lower side of the shell 2), a plate-like shell tip 6 is detachably attached to the shell 2. In this shell tip 6, an opening 7 is formed along the circumference of the outlet 3 formed in the shell 2 such that it is arranged to surround the outlet 3 (see FIG. 3). Also, non-sticky coating is applied to this shell tip 6.

Although not particularly shown, in order to install the shell tip 6 detachably to the shell 2, the shell tip 6 may be installed by an appropriate means such as bolt tightening such that the shell tip 6 does not fall during the operation of the device.

No specific restrictions are imposed on the type of the non-sticky coating to be applied to the shell tip 6 as long as it is coating to which a resin extruded from the outlet 3 hardly adheres. For example, a burned coating formed singly of a fluorine-based resin such as polytetrafluoroethylene (PTFE), perfluoroalkoxy (PFA), a tetrafluoroethylene/hexafluoropropylene copolymer (FEP) and an ethylene/tetrafluoroethylene copolymer (ETFE) or a mixture of these resins with other resin components having excellent heat resistance such as polyether ether ketone (PEEK), polyether sulfone (PES) can be given. In particular, for the reason that the wear resistance is so excellent, and hence scratches hardly affect adversely the product, a PFA-PEEK composite coating film obtained by mixing PFA and PEEK is preferable.

Such a burned coating film can be formed in a thickness of about 30 to 130 μm by a process in which a dispersion to which various additives are added together with the above-mentioned resin components is applied on a metal matrix which has been pre-coated according to need, followed by burning at a predetermined temperature.

In the extrusion die head 1 of this embodiment, such a shell tip 6 is attached to the opening side of the outlet 3, and the opening 7 of the shell tip 6 to which non-sticky coating has been applied is arranged along the circumference of the outlet 3 in such a manner that the opening 7 surrounds the outlet 3. As a result, the resin extruded from the extrusion die head 1 is hardly adhered to the outlet 3, whereby a deteriorated resin, which is considered to be a cause of a die drool, is prevented from being accumulated in the outlet 3, and generation of a die drool can be suppressed completely or for a long period of time.

Further, by attaching the shell tip 6 detachably to the shell 2, the shell tip 6 can be removed when cleaning the extrusion die head 1 according to need such as the case of the maintenance of the apparatus or the exchange of a resin, thereby cleaning is facilitated. By exchanging the shell tip 6 removed from the shell 2 by the cleaned shell tip 6 or the new shell tip 6, cleaning can be completed within a shorter period of time.

It suffices that the non-sticky coating applied to the shell tip 6 be applied along at least the inner circumference of the opening 7 formed in the shell tip 6. However, in order to prevent peeling off of the coating with the passage of time, it is preferred that the coating is applied so that the coating is extended to the surface of the shell tip 6 on which the shell tip 6 is attached to the shell 2, that is, the surface opposing to the shell 2. In respect of facilitating coating operation, non-sticky coating may be applied to the entire surface of the shell tip 6.

In the example shown in FIG. 1, non-sticky coating is applied to the entire surface of the shell tip 6.

As for the diameter øB of the opening 7 formed in the shell tip 6, it is preferred that it be equal to or larger than the diameter øA of the outlet 3 (øA≤øB).

However, if the inner circumference of the opening 7 formed in the shell tip 6 is too distant from the circumference of the outlet 3, there is a tendency that the initial object, i.e. to allow the resin to be hardly adhered to the outlet 3, cannot be attained. In order to prevent such a disadvantage, it is preferred that the diameter øA of the outlet 3 formed in the shell 2 and the diameter øB of the opening 7 formed in the shell tip 6 satisfy the relationship øB≤øA+0.2 mm. It is preferred that both diameters be appropriately adjusted in a scope that can attain the initial object in such a manner that the diameter øB of the opening 7 become slightly larger than the diameter øA of the outlet 3.

Further, on the side of the opening 7 of the shell tip 6, as shown in FIG. 1, it is possible to provide a tapered part 8 which increases in diameter along the extrusion direction of a resin. Due to such a configuration, the resin which has been extruded from the outlet 3 more hardly adheres to the opening 7 of the shell tip 6. As a result, accumulation of the deteriorated resin can be more effectively avoided, whereby generation of a die drool can be more effectively suppressed.

At this time, the angle θa of inclination of the tapered part 8 relative to the surface of the shell tip 6 on which the shell tip 6 is attached to the shell 2, i.e. the surface opposing to the shell 2, is preferably equal to or smaller than 20°. By allowing the angle to be such a value, adhesion of the resin to the shell tip 6 can be suppressed more effectively.

When such tapered part 8 is provided in the opening 7 side of the shell tip 6, if the inner circumference of the opening 7 has a sharp edge-like shape, a line-shaped trace may be formed on the surface of the extruded resin. In order to prevent such a disadvantage, it is preferred that the inner circumference of the opening 7 be allowed to be an inside surface 9 which has a thickness Ta of 0.1 to 0.5 mm which is in parallel with the extrusion direction of the resin (see FIG. 2). Further, by forming the inside surface 9 having such a thickness in the inner circumference of the opening 7, application of non-sticky coating along the inner circumference of the opening 7 becomes easy.

If the thickness Ta of the inside surface 9 exceeds the upper limit of the above-mentioned range, similar effects can be obtained. However, in respect of preventing the shell tip 6 from increasing in thickness more than required and reducing the part to which the coating is applied, the upper limit of the thickness of the inside surface 9 is set.

On the other hand, in this embodiment, a core tip 10, to which similar non-sticky coating is applied, is detachably attached to the core 4 which forms the outlet 3 together with the shell 2. Due to such a configuration, the resin extruded from the extrusion die head 1 is hardly adhered to the core 4, whereby generation of a die drool on the side of the core 4 can be suppressed.

When the core tip 10 is detachably attached to the core 4, in the example shown in FIG. 1, a plate-like core tip 10 is attached such that the front end surface of the core 4 is covered.

Not particularly shown, when the core tip 10 is detachably attached to the core 4, as explained above by referring to the shell tip 6, the core tip 10 may be attached by an appropriate means such as bolt tightening.

By detachably attaching the core tip 10 to the core 4, the core tip 10 can be removed when cleaning the extrusion die head 1 according to need. As a result, cleaning is facilitated. As explained above by referring to the shell tip 6, by exchanging the core tip 10 removed from the core 4 by the cleaned core tip 10 or the new core tip 10, cleaning can be completed within a shorter period of time.

It suffices that the non-sticky coating applied to the core tip 10 be applied along at least the outer circumference of the core tip 10. As in the case of applying coating to the shell tip 6, in order to prevent the coating from peeling off with the passage of time, it is preferred that the coating be applied so that the coating is extended to the surface of the core tip 10 on which the core tip 10 is attached to the core 4, that is, the surface opposing the core 4. In respect of facilitating the coating operation, non-sticky coating may be applied to the entire surface of the core tip 10.

In the example shown in FIG. 1, non-sticky coating is applied to the entire surface of the core tip 10.

As for the outer diameter øD of the core tip 10, it is preferred that the dimension of øD be set in such a manner that øD becomes equal to or smaller than the outer diameter øC of the front surface of the core 4 (øD≤øC) in order not to hinder the flow of the resin extruded from the outlet 3.

In this case, in order not to allow the outer circumference of the core tip 10 to be too distant from the circumference of the front surface of the core 4, t is preferred that the outer diameter øD of the core tip 10 and the outer diameter øC of the front surface of the core 4 satisfy the relationship øC≤øD+0.2 mm. It is preferred that both diameters be appropriately adjusted such that the outer diameter øD of the core tip 10 becomes slightly smaller than the outer diameter øC of the front surface of the core 4.

On the outer circumference of the core tip 10, as shown in FIG. 1, it is possible to provide a tapered part 11 which is decreased in diameter along the extrusion direction of the resin. Due to such a configuration, the resin which has been extruded from the outlet 3 more hardly adheres to the core tip 10. As a result, accumulation of the deteriorated resin can be more effectively avoided, whereby generation of a die drool can be more effectively suppressed.

At this time, the inclination angle θb of the tapered part 11 relative to the surface of the core tip 10 on which the core tip 10 is attached to the core 4, i.e. the surface opposing to the core 4, is preferably equal to or smaller than 20°. By allowing the inclination angle to be such a value, adhesion of the resin to the core tip 10 can be suppressed more effectively, as explained above referring to the shell tip 6.

Further, when such tapered part 11 is provided in the outer circumference of the core tip 10, in order to prevent a disadvantage that a line-shaped trace may be formed on the surface of the extruded resin, it is preferred that the outer circumference of the core tip 10 is allowed to be an outside surface 12 having a thickness Tb of 0.1 to 0.5 mm which is in parallel with the extrusion direction of the resin (see FIG. 2), and by forming the outside surface 12 having a thickness Tb, application of non-sticky coating along the outer circumference of the core tip 10 becomes easy, as mentioned above by referring to the shell tip 6. Not only to prevent the core tip 10 from increasing in thickness more than required, but also to reduce the part to which the coating is applied, the upper limit of the thickness Tb of the outside surface 12 is set, as mentioned above by referring to the shell tip 6.

[Second Embodiment]

Next, the second embodiment of the extrusion die head of the present invention will be described.

Figure 4:
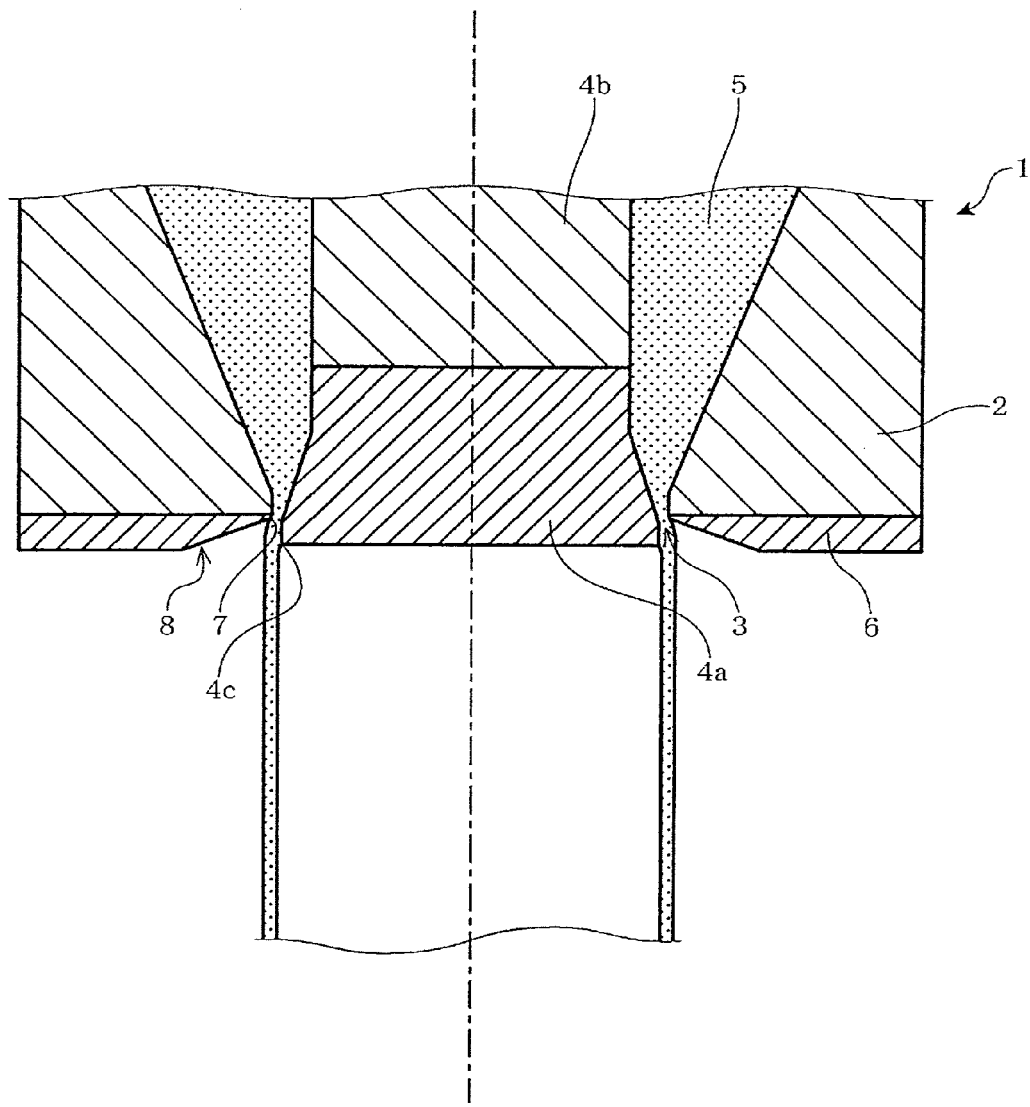
FIG. 4 is a cross-sectional view of essential parts showing the outline of the second embodiment of the extrusion die head according to the present invention.

FIG. 4 is a cross-sectional view showing the outline of the essential parts of the extrusion die head of this embodiment, mainly the outlet thereof.

In the first embodiment mentioned above, the core tip 10 is detachably attached to the core 4, and non-sticky coating is applied to the core tip 10. This embodiment is different from the first embodiment in that non-sticky coating is directly applied to the core 4.

In the example shown in FIG. 4, the core front end part 4a is removable from the base part 4b. The non-sticky coating is applied to the entire surface of the core front end part 4a. Not particularly shown, the core front end part 4a is fixed to the base part 4b by an appropriate means such as bolt tightening.

If non-sticky coating is directly applied to the core 4, it suffices that the coating be applied along at least the front edge part 4c of the core 4. However, in order to prevent peeling off of coating with the passage of time, it is preferred that not only the coating be applied from a front edge part 4c of the removed core front end part 4a which is removable from the base part 4b to said surface of the core front end part 4a, but also the coating be applied so that the coating is extended to the surface opposing to the base part 4b. Further, in respect of facilitating coating operation, like the example shown in FIG. 4, it is preferred that non-sticky coating be applied to the entire surface of the core front end part 4a.

This embodiment differs from the above-mentioned first embodiment in the above-mentioned points. This embodiment and the first embodiment are the same in other constitutions, and hence, a detailed explanation on the other constitutions is omitted here.

EXAMPLES

The present invention will be explained in more detail with reference to the following specific examples.

Figure 5:
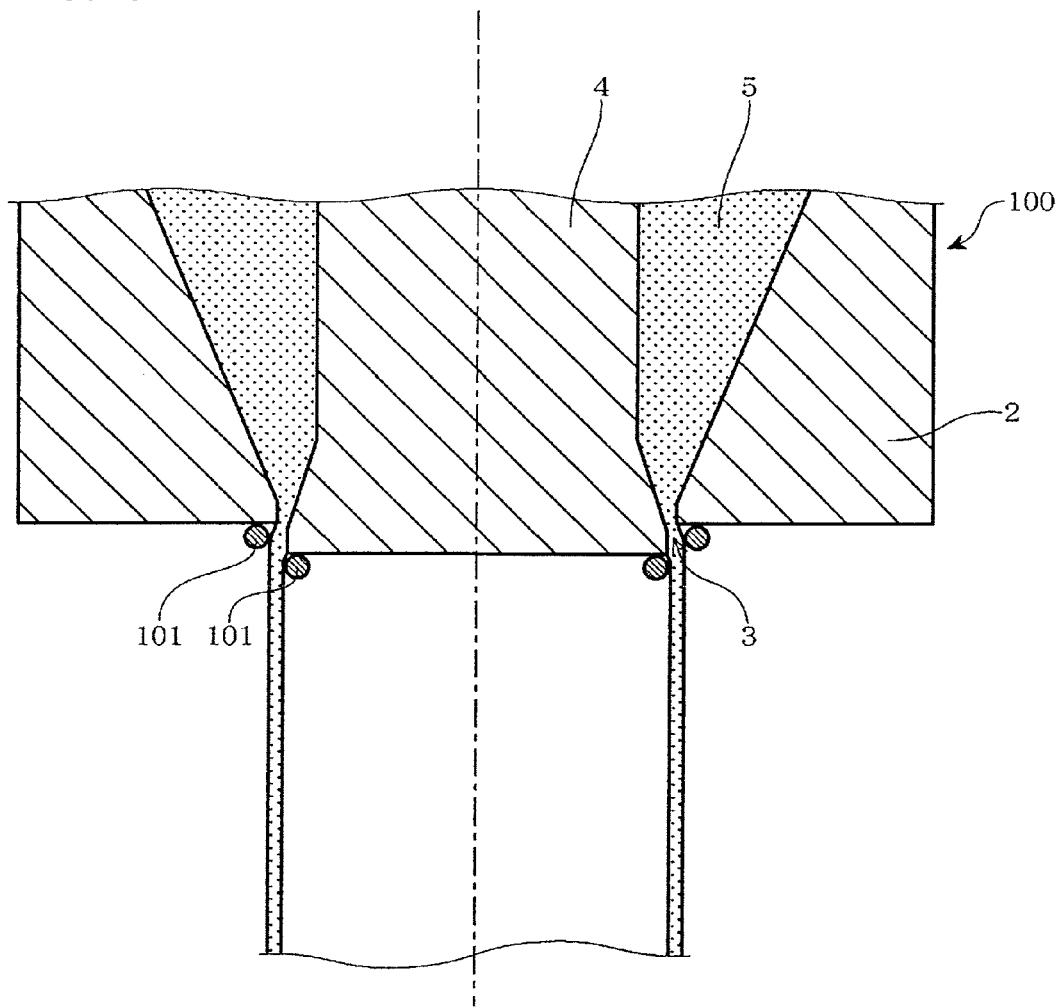
FIG. 5 is a cross-sectional view of essential parts showing the outline of a conventional extrusion die head.

The outline of the conventional extrusion die head is shown in FIG. 5. When a cylindrical parison is continuously molded by injection by using a resin material such as a polyolefin-based resin by using such extrusion die head 100, the production line had to be stopped at every 60 to 90 minutes in order to remove the die drool 101.

FIG. 5 is a cross-sectional view showing the outline of the essential parts of one example of the conventional extrusion die head, mainly the outlet. As for the elements common to those in the extrusion die head 1 shown in FIG. 1, they are indicated by the same numerals and the explanation thereof is omitted.

The conventional extrusion die head shown in FIG. 5 has been improved to that shown in FIG. 1. Specifically, the shell tip 6 on which the non-sticky coating is applied on the entire surface is attached to the opening side of the outlet 3, and the opening 7 of the shell tip 6 is arranged along the circumference of the outlet 3 in such a manner that it surrounds the outlet 3. On the other hand, the core tip 10 on the entire surface of which the non-sticky coating is applied is attached so as to cover the front side surface of the core 4. As the non-sticky coating, a PFA-PEEK composite coating film is burned in an average thickness of 100 μm.

Using the extrusion die head 1, a cylindrical parison was molded by extrusion continuously under the conditions same as those of conventional conditions. The outlet was observed after the lapse of 720 minutes from the start of molding, and generation of a die drool was not confirmed.

Hereinabove, the present invention was explained with reference to preferred embodiments. The present invention is not limited to the above-mentioned embodiments, and it is needless to say that various modifications are possible within the range of the present invention.

For example, in the above-mentioned embodiment, an example is given in which the core 4 in the shell 2 is provided between the shell 2 and the outlet 3 formed in the shell 2 with a predetermined gap being formed therebetween, and the molten resin is extruded like a hollow shape. The present invention is, however, not limited to this embodiment. By omitting the provision of the core 4, or by other methods, it can be an extrusion die head from which the molten resin is extruded in a solid shape. In this case, the shell tip 6 as mentioned above may be detachably attached to the shell 2.

The present invention can be applied by adding appropriate modifications. Specifically, the shell tip 6 or the core tip 10 on which the above-mentioned coating is applied is attached to the conventional extrusion die head or non-sticky coating can be applied to the core 4.

INDUSTRIAL APPLICABILITY

As mentioned hereinabove, the present invention can be applied to an extrusion die head which is attached to the front of the extruder and used for extruding a molten resin.

EXPLANATION OF NUMERALS

1. Extrusion die head
2. Shell
3. Outlet
4. Core
6. Shell tip
7. Opening
8. Tapered part
9. Inside surface
10. Core tip
11. Tapered part
12. Outside surface
øA Diameter of the outlet formed in the shell
øB Diameter of the opening formed in the shell tip
øC Outer diameter of the front end surface of the core
øD Outer diameter of the core tip

The invention claimed is:

1. An extrusion die head adapted to attach to a front end part of an extruder, comprising:
    a shell having an outlet for extruding a resin material which has been melt-kneaded by means of the extruder;
    a plate-like shell tip having an opening to be arranged along a circumference of the outlet in such a manner that the opening surrounds the outlet, the shell tip being detachably attached to the shell;
    a tapered part provided in an opening side of the shell tip and having a diameter increasing along an extrusion direction of the resin; and
    a non-sticky coating applied at least along an inner circumference of the opening formed in the shell tip,
    wherein an angle of inclination of the tapered part relative to a surface of the shell tip on which the shell tip is attached to the shell is equal to or smaller than 20°.

2. The extrusion die head according to claim 1, wherein an inner surface of the opening of the shell tip has a thickness of 0.1 to 0.5 mm which is in parallel with the extrusion direction of the resin.

3. The extrusion die head according to claim 1, wherein a diameter of the outlet formed in the shell (øA) and a diameter of the opening formed in the shell tip (øB) satisfy following relationship:

$$(øA) \leq (øB).$$

4. The extrusion die head according to claim 3, wherein the diameter of the outlet formed in the shell (øA) and the diameter of the opening formed in the shell tip (øB) satisfy following relationship:

$$(øB) \leq (øA) + 0.2 \text{ mm}.$$

5. The extrusion die head according to claim 1, further comprising:
    a core provided in the shell with a predetermined gap being formed between the outlet formed in the shell such that the resin which has been melt-kneaded by means of the extruder is extruded in a hollow shape;
    a plate-like core tip covering a front surface of the core;
    the core tip detachably attached to the core; and
    a non-sticky coating applied at least along an outer surface of the core tip.

6. The extrusion die head according to claim 5, wherein a tapered part which is decreased in a diameter along the extrusion direction of the resin is provided on an outer circumference side of the core tip.

7. The extrusion die head according to claim 6, wherein an angle of inclination of the tapered part relative to a surface of the core tip on which the core tip is attached to the core is equal to or smaller than 20°.

8. The extrusion die head according to claim 5, wherein an outer circumference of the core tip includes an outside surface having a thickness of 0.1 to 0.5 mm which is in parallel with the extrusion direction of the resin.

9. The extrusion die head according claim 5, wherein an outer diameter of a front surface of the core øC and an outer diameter of the core tip (øD) satisfy a following relationship:

$$(øD) \leq (øC).$$

10. The extrusion die head according to claim 9, wherein the outer diameter of the front surface of the core øC and the outer diameter of the core tip (øD) satisfy a following relationship:

$$(øC) \leq (øD) + 0.2 \text{ mm}.$$

11. The extrusion die head according to claim 1, further comprising;
    a core provided in the shell with a predetermined gap being formed between the outlet formed in the shell such that the resin which has been melt-kneaded by means of the extruder is extruded in a hollow shape;
    wherein a non-sticky coating is applied at least along a front edge part of the core.

12. The extrusion die head according to claim 1, wherein the non-sticky coating is a burned coating film comprising a fluorine-based resin.

13. The extrusion die head according to claim 12, wherein the burned coating film comprising the fluorine-based resin is a PFA-PEEK composite coating film.

14. The extrusion die head according to claim 1, wherein the angle of inclination of the tapered part is an angle between the surface of the shell tip contacting the shell and a surface of the tapered part directly linearly crossing the surface of the shell tip.

* * * * *